United States Patent [19]

Anderson

[11] 4,340,843
[45] Jul. 20, 1982

[54] KEEP-ALIVE CIRCUIT FOR GAS DISCHARGE LAMP

[75] Inventor: Thomas E. Anderson, South Euclid, Ohio

[73] Assignee: General Electric Company, Schenectady, N.Y.

[21] Appl. No.: 122,400

[22] Filed: Feb. 19, 1980

Related U.S. Application Data

[63] Continuation of Ser. No. 29,320, Apr. 12, 1979, abandoned.

[51] Int. Cl.³ .................... H05B 37/00; H05B 39/00; H05B 41/14
[52] U.S. Cl. ............................ 315/205; 315/DIG. 5; 315/DIG. 7; 315/199; 315/306; 315/307; 315/49; 315/198
[58] Field of Search .................. 315/DIG. 5, DIG. 7, 315/302, 306, 307, 308, 310, 198, 199, 88, 92, 86, 46, 47, 49, 171, 172

[56] References Cited

U.S. PATENT DOCUMENTS

| | | | |
|---|---|---|---|
| Re. 29,204 | 5/1977 | Snyder | 315/106 |
| 3,659,146 | 4/1972 | Munson | 315/92 |
| 3,767,970 | 10/1973 | Collins | 315/311 |
| 3,944,876 | 3/1976 | Helmuth | 315/DIG. 7 |
| 4,104,715 | 8/1978 | Lawson, Jr. | 315/DIG. 5 |
| 4,151,445 | 4/1979 | Davenport et al. | 315/92 |
| 4,232,252 | 11/1980 | Peil | 315/92 |
| 4,234,822 | 11/1980 | Garrison et al. | 315/209 R |
| 4,278,916 | 7/1981 | Regan et al. | 315/49 |

Primary Examiner—Saxfield Chatmon, Jr.
Attorney, Agent, or Firm—Norman C. Fulmer; Philip L. Schlamp; Fred Jacob

[57] ABSTRACT

A circuit for starting and ballasting a compact high intensity arc discharge lamp, and for preventing failure of the arc discharge. A filament connected in series with the arc lamp provides illumination during arc start-up and functions as a ballast during normal arc operation. An oscillatory starting circuit supplies starting voltage to the arc lamp until an operating arc is established. The circuit includes a "keep-alive" feature which prevents the arc from extinguishing during power fluctuations.

9 Claims, 9 Drawing Figures

KEEP-ALIVE CIRCUIT FOR GAS DISCHARGE LAMP

This is a continuation of application Ser. No. 29,320, filed Apr. 12, 1979, now abandoned.

CROSS-REFERENCES TO RELATED APPLICATIONS

Ser. No. 122,379, filed concurrently herewith, Thomas E. Anderson, "Circuit for Starting and Ballasting Arc Discharge Lamps", assigned the same as this invention.

Ser. No. 122,401, now abandoned filed concurrently herewith, Thomas E. Anderson, "Voltage Doubler Starting Circuit for Arc Lamp", assigned the same as this invention.

Ser. No. 156,229, filed June 4, 1980, William Peil and Robert J. McFadyen, "Lighting Unit", assigned the same as this invention.

BACKGROUND OF THE INVENTION

The invention is in the field of electronic circuits for operating high-pressure, high-intensity arc lamps. An example of one of many such type lamps is disclosed in U.S. Pat. No. 3,305,289 to Elmer Fridrich. Such lamps operate in three modes:

(1) Starting mode (comprising a glow breakdown mode followed by a glow-to-arc transition) in which a relatively high value of a-c or d-c starting voltage is applied across the lamp's electrodes to first condition the lamp's gases into a suitable ionized condition for striking a glow, followed by a time period up to a minute or so to cause a transition into an arc between the lamp's electrode tips;

(2) Operating mode, in which the lamp's arc discharge generates desired light output and a relatively low or moderate voltage occurs across the lamp's electrodes in response to a suitable arc discharge current as established by the ballast circuit; and (3) Hot Restart mode, in which the lamp's arc discharge fails or extinguishes for some reason such as a momentary interruption of its current supply. If the arc extinguishes, the lamp must be permitted to cool for up to a minute or more before the arc can be restarted by the normal starting voltage.

In contrast to the foregoing, low-pressure lamps such as fluorescent lamps can be started with a single short-duration relatively low voltage pulse, and furthermore do not have a hot restart problem.

Numerous circuits have been devised for starting, operating, and hot-restarting high-pressure arc lamps. Some examples are disclosed in U.S. Pat. No. 4,060,751 to Thomas E. Anderson, which discloses a variable frequency L-C resonant starting inverter circuit which increases the starting voltage until the arc is established in the lamp and the inverter circuit then functions as the operating ballast; and in U.S. Pat. No. 4,048,539 to Walker and Kornrumpf which discloses a circuit having a starting transformer secondary in series with the arc lamp to provide starting and hot-restarting of the lamp.

SUMMARY OF THE INVENTION

Objects of the invention are to provide improved circuits for operating high-pressure, high-intensity arc discharge lamps, and to provide such circuits which maintain the arc and prevent it from extinguishing when the arc current becomes reduced momentarily such as due to a momentary interruption of fluctuation of the power supply. A further object is to provide such circuits which can be compact and included in a base portion of a lamp.

The invention comprises, briefly and in a preferred embodiment, a "keep-alive" circuit for maintaining the arc in an operating discharge lamp, the circuit comprising an oscillatory circuit for generating a pulsating voltage, means to activate the oscillatory circuit whenever the arc current reduces to a "dangerously low" value and cause a pulsating voltage to maintain the arc and increase the arc current to a "safe" value, whereupon the oscillatory circuit is inactivated.

DESCRIPTION OF THE PREFERRED EMBODIMENTS

Figure 1:
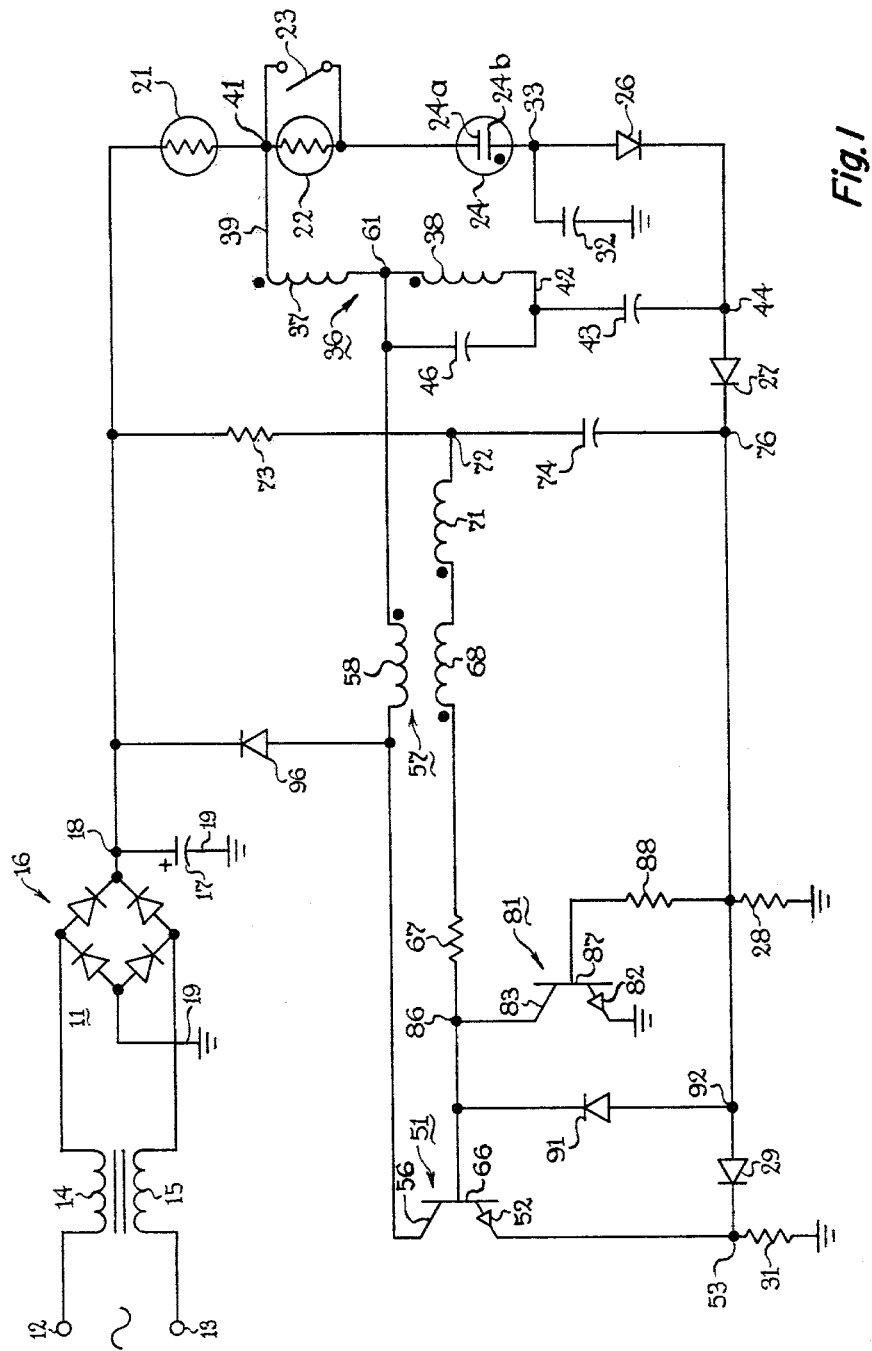
FIG. 1 is an electrical schematic diagram of a preferred embodiment of the invention.

In FIG. 1, a d-c power supply 11 comprises power input terminals 12, 13, adapted to receive d-c voltage or typical household a-c power of 120 volts, for example, which are connected via conventional transient and/or radio-interference prevention means such as inductors 14, 15 (to isolate the circuit from line transients and/or to prevent radio-interference frequencies from passing back to the terminals 12, 13), to a conventional bridge rectifier diode arrangement 16 which produces a d-c voltage charge on a filter capacitor 17 with plus polarity at its terminal 18 and minus polarity at its electrical ground terminal 19, this d-c voltage across the capacitor 17 being about 100 to 200 volts when the input a-c voltage at input terminals 12, 13, is 120 volts. The circuit will also function if a suitable d-c voltage is applied to the input terminals 12, 13.

Across the filter capacitor 17 there are connected in series, in the order named, from the + terminal 18 to the − terminal 19, an incandesible type filament 21, another incandescible type filament 22 having a manually operated shorting switch 23 thereacross, an arc discharge lamp 24, a diode 26 connected in conductive polarity, a diode 27 connected in conductive polarity, and a current sensing device such as a resistor 28. From the junction of diode 27 and resistor 28, a diode 29 is connected in conductive polarity in series with a resistor 31, which is connected to electrical ground. A capacitor 32 is connected between the junction 33 of the arc tube 24 and the diode 26, and electrical ground. In the just-described circuit, preferably the filaments 21 and 22 and the arc lamp 24 are enclosed in a single lamp bulb. The filament 21 functions to provide light during the starting mode of the arc lamp 24, and the resistor 28 functions to cause turn-off of the starting circuit when the lamp 24, reaches arc condition, and also, in accordance with the invention, functions in the "keep-alive" circuit for the arc lamp as will be described. The filament 22 and switch 23 provide two alternative illumination levels of the arc lamp 24.

An oscillatory arc-starting inverter circuit includes a transformer 36 comprising a primary winding 37 and a secondary winding 38 connected in electrical series, the free end 39 of the primary 37 being connected to the junction 41 of the filaments 21 and 22, and the free end 42 of the secondary 38 being connected via a capacitor 43 to the junction 44 of the diodes 26 and 27. A capacitor 46 is connected in parallel across the secondary winding 38 to provide a "ringing" circuit therewith, as will be described.

The oscillatory starting circuit also includes a transistor 51 having an emitter electrode 52 connected to the junction of 53 of the diode 29 and resistor 31, a collector electrode 56 connected via an auxiliary transformer 57 primary winding 58 to the junction C1 of the transformer 36 primary 37 and secondary 38 windings, and a base electrode 66 is connected via a resistor 67, a secondary winding 68 of the auxiliary transformer 57, and a third or auxiliary winding 71 of the starting transformer 36, to the junction 72 of a resistor 73 and a capacitor 74 which are connected in series between the positive voltage terminal 18 and the junction 76 of the diode 27 and resistor 28.

A control circuit for the starting circuit comprises a transistor 81 having an emitter electrode 82 connected to electrical ground, a collector electrode 83 connected to the junction 86 of the resistor 67 and the base electrode 66 of the inverter transistor 51, and a base electrode 87 connected via resistor 88 to the junction 76 of the diode 27, capacitor 74, and resistor 28, etc. The transistors 51 and 81 may conveniently be called "control switch devices", their collector and emitter electrodes may be called "main electrodes" or "output electrodes", and the base electrodes may be called "control electrodes".

A diode 91 is connected between the base electrode 66 of inverter transistor 51 and the junction 92 of diode 27 and diode 29, oriented to be current-conductive toward the base electrode 66.

Another diode 96 is connected between the collector electrode 56 of inverter transistor 51 and the + terminal 18 of the power supply.

Figure 2A:
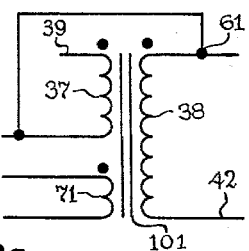
FIG. 2a and 2b show the winding arrangement of the two transformers in FIG. 1.
Figure 2B:
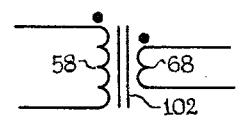
Figure 4:
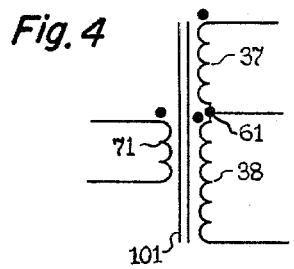
FIG. 4 shows the winding arrangement of the transformer in FIG. 3.
Figure 6:
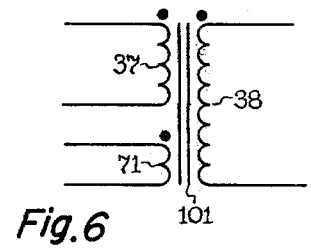
FIG. 6 shows the winding arrangement of the transformer of FIG. 5.

In FIG. 2a, the windings 37, 38, and 71 of transformer 36 are shown with their relative relationships on a core 101 which may be of ferrite material. In FIG. 2b, the windings 58 and 68 of the auxiliary transformer 57 are shown with their relative relationships on a core 102 which may be of ferrite material.

The circuit of FIG. 1 functions as follows: In initial "cold condition" starting of the arc lamp 24, d-c current from terminal 18 flows through resistor 73 and charges capacitor 74, thus applying increasing positive d-c voltage and current, via transformer winding 71, auxiliary transformer winding 68, and resistor 67, to the base 66 of lamp starting inverter transistor 51, and thus "turning on" the transistor 51 and causing current to begin to flow via filament 21, starting transformer winding 37, and auxiliary transformer winding 58, to collector electrode 56 and through emitter electrode 52 to ground via resistor 31.

The increasing current through winding 58 inductively increases, via winding 68, the positive drive to base 66, for a short time as determined by the time constant of inductors 58, 37, and the resistance of filament 21, to provide regenerative positive feedback for transistor 51. This increasing conduction of transistor 51 provides energy to the ringing circuit (winding 38 and capacitor 46) via inductive coupling from winding 71, causing sinusoidal voltages to occur across the windings 37, 38, and 71 at a frequency determined by the resonance frequency of the ringing circuit. The first half-cycle of this sinusoidal voltage across winding 71 has positive polarity such as to provide positive base current to the transistor 51, thus temporarily maintaining the transistor in its fully conductive condition and causing the filament 21 to emit light. The just-mentioned positive base current to transistor 51 drains charge from the capacitor 74, whereby the voltage thereacross decreases. As the sinusoidal voltage across winding 71 swings toward and through zero voltage and reverses polarity (negativepolarity at the end of winding 71 toward the base 66) the sum of the voltages across winding 71 and capacitor 74 decreases and reverses, thus stopping the flow of current to base 66 and biasing the transistor 51 to become non-conductive. This turning off of the transistor 51 causes a well-known inductive voltage "kick" to be produced across the windings 58 and 37 when the current flow stops therethrough. To prevent this voltage "kick" from damaging the transistor 51, the diode 96 is provided and it conducts the energy of the inductive voltage "kick" to the filter capacitor 17, thus protecting the transistor 51 and also improving the circuit efficiency. The filament 21 is not energized during the early starting stage intervals when the transistor 51 is non-conductive.

The capacitor 74 becomes recharged from voltage and current energy induced in windings 71 and 68 when the current flow therethrough to base 66 ceases as described above. This recharging path includes the resistor 67 and diode 91. As the sinusoidal voltage across winding 71 next swings toward and through zero in positive-going polarity (at the end of winding 71 toward the base 66), the combined series voltage across this winding and the capacitor 74 renders the transistor 51 conductive again, and the above-described oscillatory function continutes repetitively. In simple terms, the transistor 51 "pumps" the ringing circuit during each short turn-on time period of positive half-cycles of its oscillation. The "on" and "off" time periods of the transistor 51 do not necessarily coincide with the positive and negative half-cycles of voltage in the windings of transformer 36, because the transistor 51 duty cycle is affected by the varying voltage on capacitor 74 and may further be affected by magnetic saturation of the transformers 36 and 57. The collector-emitter current waveshape of transistor 51 resembles a square wave, and the voltage and current waveshapes in windings 37, 38 and 71 resemble a sine or cosine waveshape. The oscillation is sustained primarily by the ringing circuit which is energized by current via the filament 21.

Figure 3:
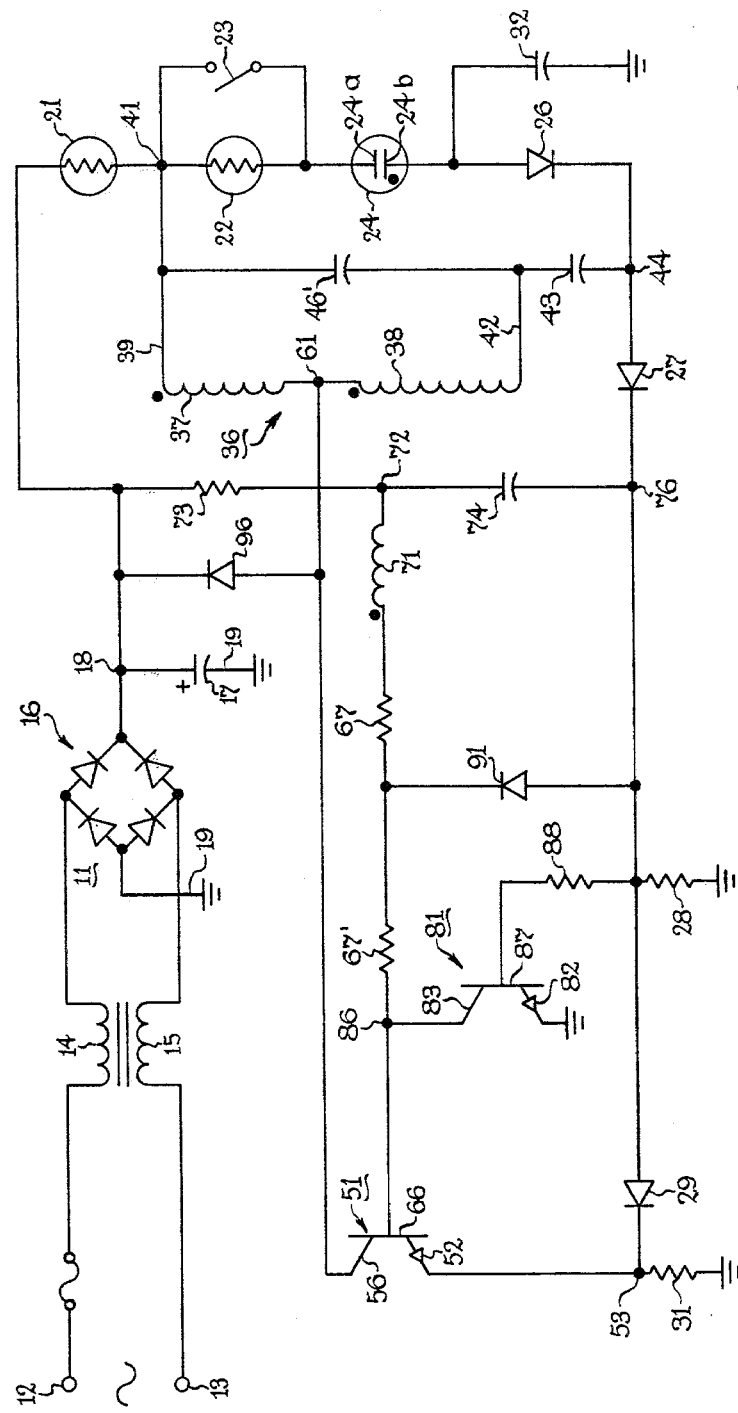
FIG. 3 is an electrical schematic diagram of an alternative preferred embodiment of the invention.

As has been explained, the oscillations in transformer 36 are controlled in frequency by the L-C ringing circuit of winding 38 and capacitor 46 (about 20 KHz to 50 KHz, for example). The ringing capacitor 46 may be connected across any of the three windings 37, 38, 71 of the starting transformer 36, or may be connected across the series-connected windings 37 and 38, as shown in FIG. 3, provided it has a value of capacitance to resonate properly with the winding inductance. The a-c voltage across primary winding 37 is stepped up by the secondary winding 37 and applied to a d-c voltage doubling circuit comprising diode 27 and capacitor 43, which doubled voltage is rectified by diode 26 and filtered somewhat by capacitor 32, and a starting voltage comprising this doubled d-c voltage (of negative polarity) produced across capacitor 32, added to the positive polarity d-c voltage at electrode 24a, is applied across the electrodes 24a and 24b of the arc lamp 24, for a short time period until the gas in the lamp 24 becomes "broken down" or ionized into a "glow" state.

Figure 8:
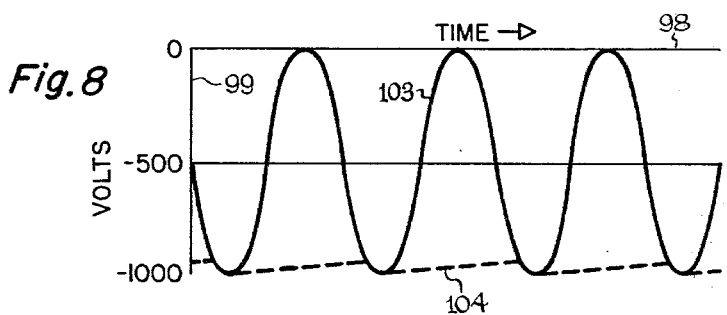
FIG. 8 shows starting voltage waveshapes.

In FIG. 8, which has a horizontal time axis 98 and a vertical voltage axis 99, curve 103 is representative of the doubled starting alternating voltage at point 44 of the circuit, and reaches a peak value of 1,000 volts negative, for example. The dashed-line curve 104 in FIG. 8 is representative of the d-c glow-actuating voltage at point 33 of the circuit. After the arc tube 24 breakdown into a glow mode, it enters into a glow-to-arc transistor (GAT) mode for several seconds until an operating arc is established during which transition the glow current in the arc tube is high enough so that the filter capacitor 32 is relatively ineffective and essentially an a-c voltage is applied across the arc tube in the GAT mode. In an alternative embodiment, the rectifier 26 and filter capacitor 32 can be omitted and the a-c voltage at point 44 is applied to arc tube 24 for initiating the glow discharge. During the starting mode time interval, the filament 21 provides initial lamp illumination.

During the aforesaid starting mode of the arc lamp 24 the current through the lamp 24 and series resistor 28 is sufficiently low so that the voltage drop across resistor 28 leaves the control transistor 81 in the "off" condition, i.e., with none or low current through its emitter 82—collector 83 path. When the aforesaid operating arc discharge is established the arc tube 24, the current in the series resistor 28 reaches a sufficient value to establish a high enough voltage across resistor 28 to switch the control transistor 81 into the "on" condition so that it draws current, through its collector-emitter path and through resistor 67 and transformer windings 68 and 71 and resistor 73, to render the bias on transistor 51 base electrode 66 sufficiently relatively low to turn the starting transistor 51 "off", thus stopping the starting voltage generation and permitting the arc tube 24 to draw current from the power supply 11 and operate in normal mode as ballasted by the filament 21 (which now generates low or none incandescent illumination). The operating dimming switch 23 can be manually or otherwise opened or closed if desired to cause reduced or increased illumination of arc tube 24 due to the adding or reduced series resistance ballast.

When the arc tube 24 is in normal d-c operating mode, its d-c current flows from power supply terminal 18 through ballast resistor 21 (and in series through additional dimming ballast resistor 22 if the dimming switch 23 is opened), through the arc lamp 24, diodes 26 and 27, and the path to ground of resistor 28 and the series-connected diode 29 and resistor 31 which are in parallel with resistor 28. The diode 29 and resistor 31 function to limit the maximum voltage drop across resistor 28, for example, to 1.4 volts. The capacitor 43 prevents d-c current from the arc tube operating current source (at point 18) from flowing through the transformer windings 37 and 38.

Figure 7:
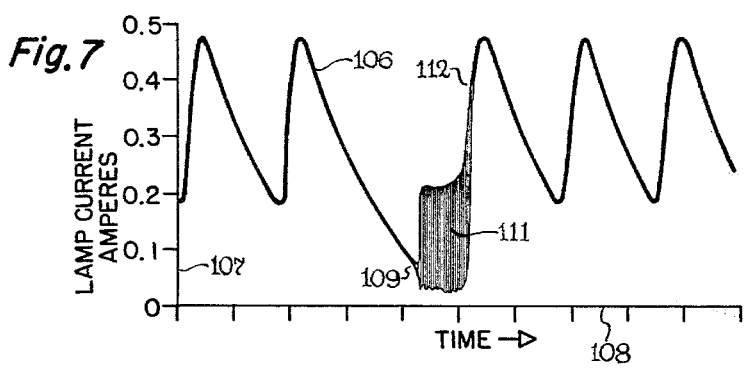
FIG. 7 shows a typical keep-alive hysteresis operation of the circuits of the schematics of FIGS. 1, 2 and 5.

FIG. 7 illustrates the arc tube operating current waveshape 106, on a current axis 107 with respect to a time axis 108, which is the normal operating waveshape except for a center portion which will be described. The normal operating arc current is not pure d-c, and fluctuates periodically with the rectification of rectifier 16, because the capacitance value of the main filter capacitor 17 is chosen as low as feasible for achieving reliable operation of the arc lamp 24. A larger value of filter capacitor 17 would provide a smoother arc current 106, but would be more costly and of larger physical size. Having a value of 50 microfarads in a preferred embodiment, the capacitor 17 is one of the larger components of the circuit, along with the transformers 36 and 57.

One type of typical arc tube 24, for example, has a voltage drop of about 85 volts thereacross, during normal arc operation, at an average arc current of about 350 milliamperes.

In accordance with the invention, in the event that the normal illuminating arc current in the arc tube 24 should begin to falter or fail, such as due to a temporary reduction or interruption of d-c power from the power supply 16, which may be due to a temporary fluctuation in input a-c power supply at input terminals 12 and 13, the arc "keep-alive" feature of the circuit functions as follows. if the instantaneous arc current 106 or the range of this arc current in the tube 24, falls to a "dangerously low" value such as at 109 in FIG. 7 (70 milliamperes, for example), it causes a reduction of current in the series resistor 28 to a value at which the voltage across resistor turns the control transistor 81 "off", thus turning the starting transistor 51 "on" (the reverse of the aforesaid turning on and off of these transistors when the operating arc becomes established in arc tube 24), whereupon the aforesaid starting circuit begins to generate starting voltage for the arc lamp 24, before the arc in the lamp 24 has time to extinguish, thus maintaining the arc before it completely extinguishes, and restoring it to normal operating mode. This "keep-alive" starting voltage is the same as shown in FIG. 8, and its typical current waveform is indicated at 111 in FIG. 7, and it persists until the arc lamp current resumes a normal operating value in its normal operating range such as the point 112 in FIG. 7 (350 milliamperes, for example), whereupon the voltage across control resistor 28 causes the starting circuit to turn off as has been described. This "keep-alive" feature of the invent on thus prevents the arc in lamp 24 from accidentally extinguishing completely which would involve the undesirable "hot restart" mode in which the arc lamp must be allowed to cool for a time period, such as a minute or so, before it can be restarted. The "keep-alive" starting voltage circuit is less sensitive to power supply voltage fluctuations than is the arc tube 24, and thus can operate from a power fluctuation to a low voltage value that would cause the arc in tube 24 to extinguish.

The "keep-alive" circuit feature of the invention is designed to have a hysteresis effect by which the starting circuit is actuated when the arc current falls to a relatively low given value such as 109 in FIG. 7 and continues oscillating until the arc current builds up to a relatively higher desired operating given value such as at 112 in FIG. 7. The value at 109 is below the normal range of operating current which may fluctuate due to ripple or an a-c component in the d-c source voltage at 18; and the value 112 is within the normal range of current but greater than the lower peaks for the waveform 106. This hysteresis effect is achieved in two cooperating ways, simultaneously, as follows:

While the oscillatory starting circuit (comprising transistor 51 and transformers 37 and 57 and capacitor 46) is functioning, the positive half cycles of oscillatory energy in the winding 71 provide current into the base 66 of transistor 51, via winding 68 and resistor 67, the return path of this positive current being via resistors 31, 28, and capacitor 74, this return path current thus being responsive to the functioning of the oscillatory circuit. This current through resistor 28 is in the opposite direction as is the current flowing therethrough from the arc lamp 24, thus causing a lower voltage drop across resistor 28 than would be caused by the current from the arc lamp 24. Thus the arc current in lamp 24 must build up to a higher value (at or near point 112 in FIG. 7) in order to increase the voltage on resistor 28 to a value to bias transistor 81 on and transistor 51 off, to stop the starting voltage oscillations, than the value of arc current at point 109 in FIG. 7 which caused the starting oscillator to function.

The second way in which the aforesaid hysteresis effect is achieved involves the gain of transistor 81. When the starting circuit is not operating and the transistor 81 is conductive, a low value of current flows into the collector 83, as determined by the value of resistors 67 and 73 and the supply voltage at 18, and also the base current into base 87, via resistors 28 and 88, is a low value. However, when the starting voltage circuit is operating, in order for the control transistor 81 to become conductive and turn off the oscillating voltage, it must divert a relatively large current, via its collector 83, from the base 66 of transistor 51. This requires a higher value of base current into base 87, and hence a higher value of arc lamp current through resistor 28, to render the transistor 81 conductive and cause the starting circuit to stop oscillating than was the base current required to cause the control transistor 81 to turn off and cause the oscillator to turn on when the arc lamp current reached a "dangerously low" value at point 109 in FIG. 7. This contributes to the aforesaid hysteresis effect so that the arc current builds up to a normal operating value such as at the point 112 in FIG. 7.

The circuit embodiment of FIG. 3 is generally similar to that of FIG. 1, and the same components are designated by the same numerals. The FIG. 3 circuit omits the feedback transformer 57 shown in FIG. 1, and its function is performed by the transformer 36 which is constructed so that the primary winding 37 is magnetically more tightly coupled to the auxiliary winding 71 than it is to the secondary winding 38. Thus the windings 37 and 71 additionally function as a feedback transformer whereby increasing current through winding 37 to collector 56 causes increased current to the base 66 via the inductive coupling of windings 37 and 71, which in turn causes increased collector current, etc. In FIG. 3 the ringing capacitor 46' is connected across the series-connected primary and secondary windings 37 and 38, and has a value so as to resonate with these windings at a desired starting voltage frequency. A resistor 67' is added in FIG. 3, between resistor 67 and the base 66 of transistor 51, and it functions to increase the "on" time periods of the oscillating transistor 51 and thus increase the average current through the filament 21 thereby increasing its brightness. This is accomplished by providing more resistance in the discharge path of capacitor 74 into the base of 66 of transistor 51 than the value of resistance in the recharging path of capacitor 74. More specifically, the resistive discharge path of capacitor 74 includes resistors 67, 67', 31, and 28, whereas the resistive path for the recharge of capacitor 74 by the aforesaid inductive kick in winding 71 includes only the resistor 67 (because of diodes 29 and 91). Thus the capacitor 74 discharges relatively more slowly and the transistor 51 is "on" longer than its "off" periods during which the capacitor 74 recharges relatively more rapidly. This asymetrical wave shape of transistor 51 is "on" longer than its "off" periods during which the capacitor 74 recharges relatively more rapidly. This asymetrical wave shape of transistor 51 current does not affect the sinusoidal waveshapes in windings 37, 38, and 71 since the transistor 51 relates to these windings only during its short-duration turn-on times during which the changing current in winding 37 induces current in windings 38 and 71 and "pumps" the ringing circuit. During the "on" periods of transistor 51, the filament 21 is energized and the only waveshape changes in windings 37, 38, and 71 is caused by the ringing circuit.

Figure 5:
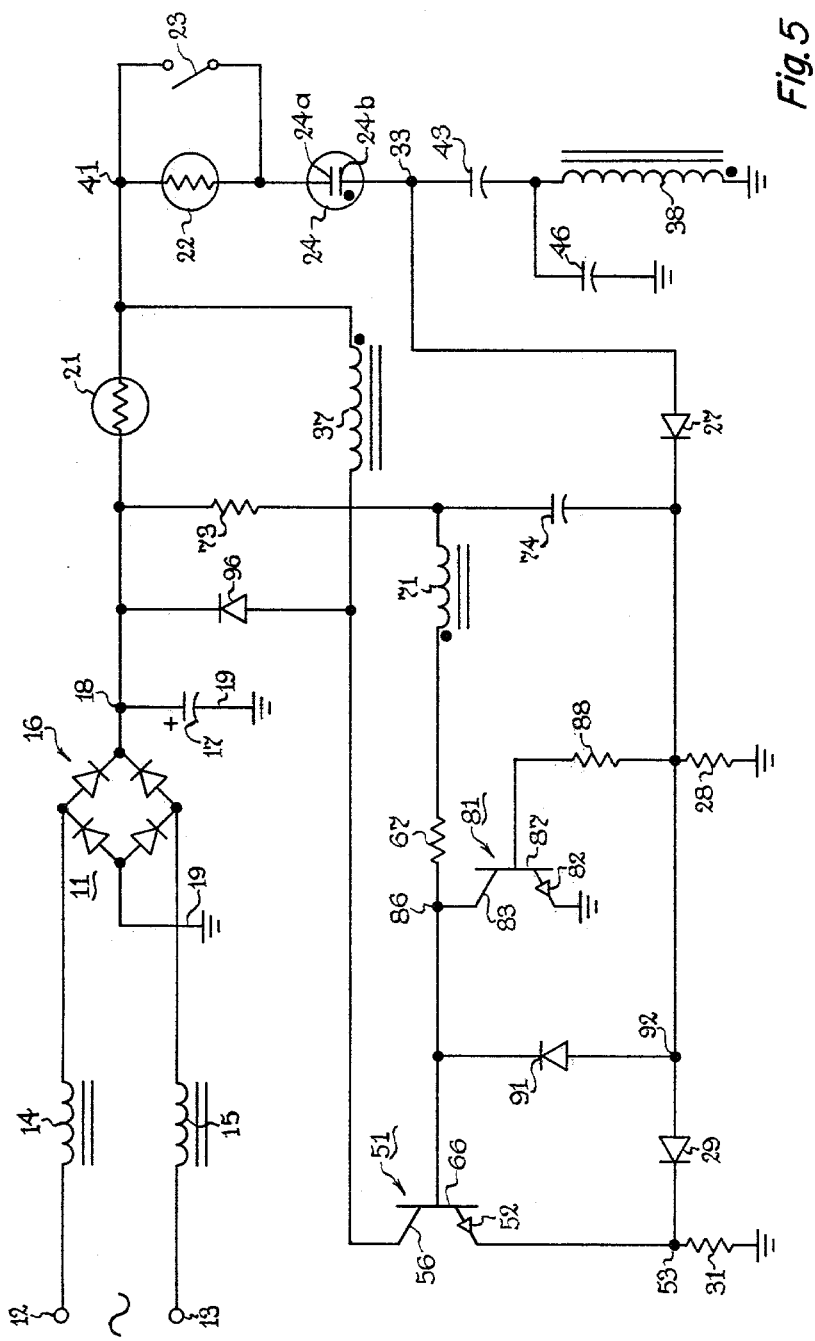
FIG. 5 is an electrical schematic diagram of a further preferred embodiment of the invention.

The circuit embodiment of FIG. 5 is generally the same as FIG. 1, but omits the feedback transformer 57 in the manner described above for FIG. 3, and has the secondary winding 38 connected so as not to be in electrical series with nor directly connected to primary winding 37. Also in FIG. 5, the starting voltage rectifier diode 26 and filter capacitor 32 of FIG. 1 have been omitted, and the arc tube 24 is started with a-c voltage.

Some typical component values in a preferred circuit are as follows:

| | |
|---|---|
| Capacitor 17: | 50 microfarads |
| Capacitor 32: | 50 picofarads |
| Capacitor 43: | 0.003 microfarads |
| Capacitor 46: | 0.003 microfarads |
| Capacitor 74: | 0.1 microfarads |
| Resistor 28: | 10 ohms |
| Resistor 31: | 1.5 ohms |
| Resistor 67: | 47 ohms |
| Resistor 73: | 39K ohms |
| Resistor 88: | 1 K ohms |
| Filament 21: | 60 watts |
| Filament 22: | 40 watts |

The above-described circuits have been tested and found to function well in starting, running, and maintaining ("keep-alive" feature) arc lamps, in the manner described. Also, the circuit generates relatively little heat, largely due to the feature of the starting transformer being isolated from the operating current path of the arc tube, and thus the circuit can be compact and included in a base portion of the lamp, with the arc tube 24 and filaments 21 and 22 being in a bulb portion of the lamp. The base portion can include a threaded part so that the unitary lamp unit can be screwed into electrical sockets.

While preferred embodiments of the invention have been shown and described, various other embodiments and modifications thereof will become apparent to persons skilled in the art, and will fall within the scope of the invention as defined in the following claims. For example, the current sensing resistor 28, referred to generally herein as a current sensing device, could be replaced with other suitable components such as a bilaterally conductive semiconductor device or a plurality of semiconductor devices arranged to provide a bilaterally conductive system, e.g. a pair of diodes connected in parallel with unlike electrodes connected together.

I claim:

1. A keep-alive circuit for maintaining the arc in an operating arc lamp, comprising circuitry for generating a pulsating voltage, means to activate said circuitry whenever the arc current in said arc lamp reduces to a first given value below the normal range of operating values and greater than zero, means to apply said pulsating voltage to said arc lamp before the arc has time to extinguish, to maintain the arc and increase the arc current, and means to inactivate said circuitry when said arc current increases to a second given value, said second given value of arc current being greater than said first given value thereof.

2. A circuit as claimed in claim 1, in which said second given value of arc current falls within said normal range of operating values of arc current.

3. A circuit for starting and operating a gas-filled, high-pressure high-intensity type of arc lamp from an electric power source, comprising an oscillatory circuit for providing pulsating voltage, means for applying to said arc lamp a starting voltage derived from said oscillatory circuit for a time period until an operating arc is established in said lamp, means to inactivate said oscillatory circuit when said operating arc is established, means connected for ballasting said arc lamp for operation from said electric power source, and a keep-alive circuit for maintaining the arc in said lamp, said keep-alive circuit comprising means to activate said oscillatory circuit whenever the arc current in said lamp reduces to a first given value greater than zero and below the normal range of operating values and thus causing said starting voltage to be applied to said arc lamp before the arc has time to extinguish, to maintain the arc and increase the arc current, and means to inactivate said oscillatory circuit when said arc current increases to a second given value, said second given value of arc current being greater than said first given value thereof.

4. A circuit as claimed in claim 3, in which said second given value of arc current falls, within said normal operating values of current.

5. A circuit as claimed in claim 3, in which said oscillatory circuit includes a current sensing device connected in series with the operating current path of said arc lamp, and in which said oscillatory circuit includes a switch device having a control electrode, and control means connected between said current sensing device and said control electrode for biasing said switch device in the "off" condition and hence turning off said oscillatory circuit in response to a desired value of arc lamp operating current being reached, and in which said keep-alive circuit includes said current sensing device, said control means and said oscillatory circuit, wherein said current sensing device and control means function to bias said switch device to the "on" condition and activate said oscillatory circuit whenever the operating arc lamp current reduces to said first given value, and means responsive to the functioning of said oscillatory circuit for feeding some current through said current sensing device in a direction opposite to that of said arc lamp current whereby said control means turns off the oscillatory circuit when the lamp current rises to said second given value.

6. A circuit as claimed in claim 5, in which said second given value of arc current falls within said normal range of operating values of arc current.

7. A circuit as claimed in claim 5 in which said current sensing device is a resistor.

8. A circuit as claimed in claim 5, in which said control means includes a control switch device having an output electrode and a control electrode, means connecting said output electrode to said control electrode of the oscillatory circuit switch device, means connecting said control electrode of the control switch device to said current sensing device and means connected to supply current jointly to said output electrode of the control switch device and said control electrode of the oscillatory circuit switch device, said control switch when biased to be conductive functioning to render said oscillatory circuit switch device non-conductive, and said control switch when biased to be non-conductive functioning to render said oscillatory circuit switch device conductive, whereby said control switch device requires a larger value of control electrode current to render it conductive than to render it non-conductive.

9. A circuit as claimed in claim 8, in which said current sensing device is a resistor.

* * * * *